(12) United States Patent
Chika et al.

(10) Patent No.: US 9,736,808 B2
(45) Date of Patent: Aug. 15, 2017

(54) CONTROL APPARATUS, RELAY APPARATUS, COMMUNICATION SYSTEM, PROGRAM, AND CONTROL METHOD

(71) Applicant: SoftBank Corp., Tokyo (JP)

(72) Inventors: Yoshioki Chika, Leawood, KS (US); Keith Sutton, Reston, VA (US); Ryuji Wakikawa, Leawood, KS (US)

(73) Assignee: SoftBank Corp., Tokyo (JP)

( * ) Notice: Subject to any disclaimer, the term of this patent is extended or adjusted under 35 U.S.C. 154(b) by 131 days.

(21) Appl. No.: 14/953,415

(22) Filed: Nov. 29, 2015

(65) Prior Publication Data

US 2016/0081055 A1    Mar. 17, 2016

Related U.S. Application Data

(63) Continuation of application No. PCT/JP2014/001310, filed on Mar. 7, 2014.

(30) Foreign Application Priority Data

Feb. 17, 2014  (JP) .................................. 2014-027859

(51) Int. Cl.
*H04W 64/00* (2009.01)
*H04W 16/26* (2009.01)
(Continued)

(52) U.S. Cl.
CPC ......... *H04W 64/003* (2013.01); *H04W 4/046* (2013.01); *H04W 16/26* (2013.01);
(Continued)

(58) Field of Classification Search
CPC .............................. H04W 24/00; H04L 43/50
See application file for complete search history.

(56) References Cited

U.S. PATENT DOCUMENTS

2002/0022452 A1   2/2002  Toya
2003/0092443 A1*  5/2003  Hiyama ................ H04W 88/02
                                       455/435.1
(Continued)

FOREIGN PATENT DOCUMENTS

JP    2007-258898 A    10/2007
JP    2012-054732 A     3/2012

OTHER PUBLICATIONS

International Preliminary Report on Patentability for International Application No. PCT/JP2014/001310, issued by the International Bureau of WIPO on Sep. 1, 2016.
(Continued)

*Primary Examiner* — Andrew Lai
*Assistant Examiner* — Zhiren Qin

(57) ABSTRACT

A mobile object communication system is configured with the assumption that a base station is fixed. Therefore, signal quality becomes unstable if the base station moves freely. Provided is a control apparatus controlling a relay apparatus that is mounted in a mobile object and relays communication between a base station and a communication terminal, including a mobile object information acquiring section that acquires mobile object information indicating a state of the mobile object and a control section that controls the relay apparatus based on the mobile object information. If the movement speed of the mobile object is judged to be less than a predetermined value, the control section may generate a relay control signal indicating that a relay function of the relay apparatus is to be activated.

15 Claims, 8 Drawing Sheets

(51) Int. Cl.
*H04W 4/04* (2009.01)
*H04W 36/32* (2009.01)
*H04W 4/02* (2009.01)
*H04W 88/04* (2009.01)

(52) U.S. Cl.
CPC ............ *H04W 36/32* (2013.01); *H04W 4/025* (2013.01); *H04W 88/04* (2013.01)

(56) References Cited

U.S. PATENT DOCUMENTS

| | | | | |
|---|---|---|---|---|
| 2006/0166618 | A1* | 7/2006 | Bakaimis | H04B 7/155 455/11.1 |
| 2009/0104911 | A1 | 4/2009 | Watanabe et al. | |
| 2010/0304665 | A1 | 12/2010 | Higuchi | |
| 2011/0014864 | A1* | 1/2011 | Sukiasyan | H01Q 1/246 455/7 |
| 2011/0019606 | A1 | 1/2011 | Umeda et al. | |
| 2012/0282961 | A1* | 11/2012 | Bienas | H04W 24/00 455/507 |
| 2013/0337811 | A1* | 12/2013 | Faerber | H04W 36/0072 455/436 |
| 2015/0043422 | A1* | 2/2015 | Fujishiro | H04W 16/26 370/315 |
| 2015/0350859 | A1* | 12/2015 | Hiben | H04W 4/22 455/404.1 |
| 2016/0204847 | A1* | 7/2016 | Ryu | H04B 7/15507 455/7 |

OTHER PUBLICATIONS

International Search Report for International Application No. PCT/JP2014/001310, issued by the Japan Patent Office on May 27, 2014.

\* cited by examiner

| VEHICLE ID 502 | CURRENT POSITION 504 | SPEED [km/h] 506 | VEHICLE ORIENTATION 508 | DRIVE SYSTEM STATE 510 | REMAINING BATTERY LIFE 512 | BUSINESS OPERATION STATE 514 | BACK DOOR STATE 516 |
|---|---|---|---|---|---|---|---|
| .. | .. | .. | .. | .. | .. | .. | .. |
| 42 | *** | 0 | EAST | ON | *** | EMPTY | OPEN |
| 44 | *** | 0 | EAST | ON | *** | EMPTY | CLOSED |
| 46 | *** | 0 | EAST | OFF | *** | NONE | NONE |
| 48 | *** | 0 | EAST | ON | *** | PAYMENT BEING MADE | CLOSED |
| *** | *** | 40 | NORTH | ON | *** | FULL | CLOSED |
| .. | .. | .. | .. | .. | .. | .. | .. |

| RELAY APPARATUS ID (602) | VEHICLE ID (604) | CURRENT POSITION (606) | RELAY FUNCTION STATE (608) |
|---|---|---|---|
| ⋮ | ⋮ | ⋮ | ⋮ |
| 122 | 42 | * * * | INACTIVE (ACTIVE WITHIN VEHICLE) |
| 124 | 44 | * * * | ACTIVE |
| 126 | 46 | * * * | INACTIVE |
| 128 | 48 | * * * | ACTIVE |
| * * * | * * * | * * * | INACTIVE |
| ⋮ | ⋮ | ⋮ | ⋮ |

| TERMINAL ID | CURRENT POSITION | ACCESS POINT ID |
|---|---|---|
| ⋮ | ⋮ | ⋮ |
| 30 | *** | 124 |
| *** | *** | 124 |
| *** | *** | 128 |
| *** | *** | 128 |
| *** | *** | 20 |
| ⋮ | ⋮ | ⋮ |

FIG. 7

| 800 | 802 | 804 | 806 | 808 | 810 | 812 | 814 |
|---|---|---|---|---|---|---|---|
| | AREA ID | RELAY APPARATUS ID | AREA POSITION | DIRECTION OF APPROACH | TIME SPAN | RELAY EFFECT | NUMBER OF RELAY APPARATUSES |
| | .. | .. | .. | .. | .. | .. | .. |
| | tokyo_03 | ALL | *** | EAST | 0:00 ~ 24:00 | HIGH | UP TO 10 |
| | tokyo_04 | ALL | *** | ALL DIRECTIONS | WEEKENDS AND HOLIDAYS | NONE | NONE |
| | *** | ALL | *** | WEST | WEEKDAYS | MEDIUM | 3 TO 5 |
| | *** | 124 | *** | SOUTH | 20:00 ~ 06:00 | LOW | 1 |
| | *** | 124 | *** | NORTH | 08:00 ~ 18:00 | HIGH | 3 TO 5 |
| | .. | .. | .. | .. | .. | .. | .. |

FIG. 8

CONTROL APPARATUS, RELAY APPARATUS, COMMUNICATION SYSTEM, PROGRAM, AND CONTROL METHOD

The contents of the following Japanese patent application are incorporated herein by reference:
NO. 2014-027859 filed on Feb. 17, 2014.
The contents of the following PCT patent application are incorporated herein by reference: NO. PCT/JP2014/001310 filed on Mar. 7, 2014.

BACKGROUND

1. Technical Field

The present invention relates to a control apparatus, a relay apparatus, a communication system, a program, and a control method.

2. Related Art

The use of vending machines, for example, as base stations in response to a sudden increase in traffic has been proposed.
Patent Document 1: Japanese Patent Application Publication No. 2012-54732

However, a mobile object communication system is configured on the assumption that the base stations are fixed. This is true even for mobile base station vehicles. Therefore, the signal quality becomes unstable when the base stations move freely.

SUMMARY

According to a first aspect of the present invention, provided is a control apparatus controlling a relay apparatus that is mounted in a mobile object and relays communication between a base station and a communication terminal, the control apparatus comprising a mobile object information acquiring section that acquires mobile object information indicating a state of the mobile object; and a control section that controls the relay apparatus based on the mobile object information.

In the control apparatus described above, the control section may judge whether movement speed of the mobile object is less than a predetermined value, based on the mobile object information, and if the movement speed of the mobile object is judged to be less than the predetermined value, the control section may generate a relay control signal indicating that a relay function of the relay apparatus is to be activated.

The control apparatus described above may further comprise a communication state acquiring section that acquires position information of the communication terminal, communication quality of communication at a position indicated by the position information of the communication terminal, information relating to time during which communication is performed, and information indicating the presence of the relay apparatus that has relayed communication; and an analyzing section that analyzes the information acquired by the communication state acquiring section and calculates an effect of the relay apparatus on communication quality in a specified area.

The control apparatus described above may further comprise an area information acquiring section that acquires position information of one or more areas in which the relay function of the relay apparatus is to be activated. In the control apparatus described above, the mobile object information may include position information of the mobile object, the control section may judge whether the relay apparatus is located in one of the one or more areas based on the position information of the mobile object and the position information of the one or more areas, and if it is judged that the relay apparatus is located in the one or more areas and that the movement speed of the mobile object is less than the predetermined value, the control section may generate the relay control signal.

In the control apparatus described above, the position information of the one or more areas may include route of approach information in which information relating to a route of approach to each of the one or more areas is associated with information indicating whether the relay function of the relay apparatus is to be activated, the control section may further determine whether the relay function of the relay apparatus is to be activated based on the position information of the mobile object and the route of approach information, and if it is judged that the relay apparatus is located in one of the one or more areas, the movement speed of the mobile object is less than a predetermined value, and the relay function of the relay apparatus is to be activated, the control section may generate the relay control signal.

The control apparatus described above may further comprise a communication state acquiring section that acquires position information of the communication terminal, communication quality of communication at a position indicated by the position information of the communication terminal, information relating to time during which communication is performed, and information indicating the presence of the relay apparatus that has relayed communication; an analyzing section that analyzes the information acquired by the communication state acquiring section and calculates an effect of the relay apparatus on communication quality in a specified geographical range; and an effective area determining section that references an analysis result of the analyzing section, extracts a geographical range in which the effect of the relay apparatus on the communication quality conforms to a predetermined standard, and sets the extracted geographical range to be a geographical range of one or more areas in which the relay function of the relay apparatus is to be activated.

The control apparatus described above may further comprise a relay position acquiring section that acquires position information indicating positions of a plurality of the relay apparatuses; and a relay apparatus selecting section that selects the relay apparatus to relay communication between the base station and the communication terminal, based on the position information of the relay apparatuses and mobile object information of each mobile object in which the relay apparatuses are mounted.

In the control apparatus described above, the control section may generate a control signal indicating that the relay functions of the relay apparatuses not selected by the relay apparatus selecting section are to be deactivated.

According to a second aspect of the present invention, provided is a control apparatus comprising a relay position acquiring section that is mounted in a mobile object and acquires position information indicating positions of a plurality of relay apparatuses relaying communication between the base station and the communication terminal; a terminal position acquiring section that acquires position information indicating the position of the communication terminal; a mobile object information acquiring section that acquires mobile object information indicating a state of a mobile object; and a relay apparatus selecting section that selects a relay apparatus to relay communication between the base station and the communication terminal, based on the position information of the plurality of relay apparatuses, the position information of the communication terminal, and the mobile object information.

The control apparatus described above may further comprise a control signal generating section that generates a handover control signal for controlling a handover of the communication terminal, based on a selection result from the relay apparatus selecting section. In the control apparatus described above, the relay apparatus may be supplied with power from the mobile object.

According to a third aspect of the present invention, provided is a relay apparatus comprising the control apparatus described above and a relay section that relays communication between the base station and the communication terminal.

According to a fourth aspect of the present invention, provided is a communication system comprising the control apparatus described above and the relay apparatus.

According to a fifth aspect of the present invention, provided is a program causing a computer to function as the control apparatus described above. The program may be provided in a non-temporary computer readable medium storing, and the program may cause a computer to function as the control apparatus described above.

According to a sixth aspect of the present invention, provided is a control method for controlling a relay apparatus that is mounted in a mobile object and relays communication between a base station and a communication terminal, the control method comprising acquiring mobile object information that indicates a state of the mobile object; and controlling the relay apparatus based on the mobile object information.

According to a seventh aspect of the present invention, provided is a control method comprising acquiring position information indicating positions of a plurality of the relay apparatuses relaying communication between the base station and the communication terminal; acquiring position information indicating a position of the communication terminal; acquiring mobile object information that identifies a state of a mobile object; and selecting the relay apparatus to relay communication between the base station and the communication terminal based on the position information of the relay apparatuses, the position information of the communication terminal, and the mobile object information.

The summary clause does not necessarily describe all necessary features of the embodiments of the present invention. The present invention may also be a sub-combination of the features described above.

BRIEF DESCRIPTION OF THE DRAWINGS

FIG. 5 schematically shows an exemplary data table 500.

FIG. 6 schematically shows an exemplary data table 600.

FIG. 7 schematically shows an exemplary data table 700.

FIG. 8 schematically shows an exemplary data table 800.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
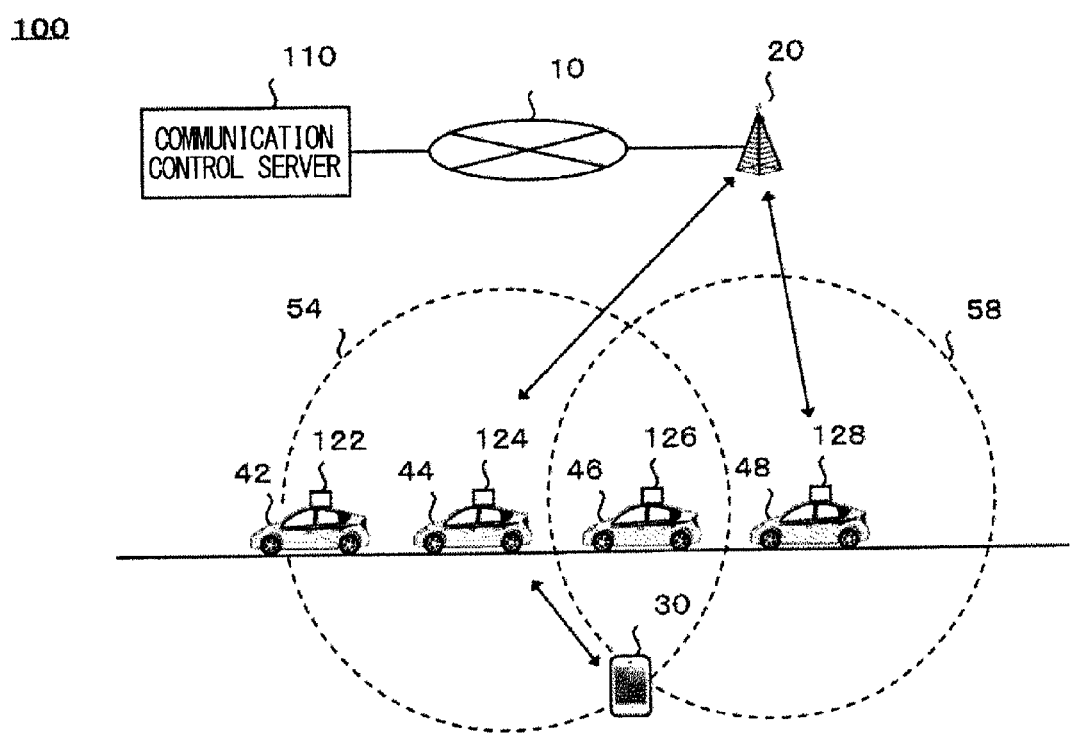
FIG. 1 schematically shows an exemplary system configuration of the communication system 100.

FIG. 1 schematically shows an exemplary system configuration of a communication system 100. In FIG. 1, the communication system 100 is shown together with a communication network 10, a base station 20, a communication terminal 30, a taxi 42, a taxi 44, a taxi 46, a taxi 48, a femto cell 54, and a femto cell 58. In the present embodiment, the communication system 100 includes a communication control server 110, a relay apparatus 122, a relay apparatus 124, a relay apparatus 126, and a relay apparatus 128. The communication control server 110 is an example of a control apparatus.

The communication network 10 may be a transmission path for wireless communication, or may be a combination of a transmission path for wireless communication and a transmission path for wired communication. The communication network 10 may be a mobile object communication network such as a cellular telephone network, a wireless packet communication network, the Internet and a dedicated line, or a combination of any of these.

The base station 20 relays the communication between the communication terminal 30 and other communication terminals. In the present embodiment, the base station 20 is fixed and does not move. The base station 20 may be a macro base station that forms a communication area having a radius from hundreds of meters to tens of kilometers (referred to as a macro cell), or may be a pico base station that forms a communication area with a radius from 100 meters to 200 meters (referred to as a pico cell).

The communication terminal 30 can be any apparatus that sends and receives information via the communication network 10, and can be exemplified by a personal computer, mobile terminal, wireless terminal, and the like that has a Web browser installed. The mobile terminal can be exemplified by a mobile telephone, a smart phone, a notebook computer, a laptop computer, a PDA, a tablet terminal, a wearable computer, and the like.

The taxi 42, the taxi 44, the taxi 46, and the taxi 48 are each an example of a mobile object. A mobile object may be any object that moves under the control of a person or a computer, and can be exemplified by vehicles such as a train, an automobile, or a motorcycle; light vehicles such as a bicycle, an electric powered bicycle, or a rickshaw; a boat; flying objects that are capable of hovering such as a wireless helicopter, an unmanned helicopter, or a dirigible; and the like. The mobile object preferably includes a power source such as a battery. The mobile object preferably has a computer mounted thereon to control the state of the movement of the mobile object.

The state of a mobile object can be exemplified by the current position of the mobile object, movement history of the mobile object, movement speed of the mobile object, orientation of the mobile object, the state of equipment of the mobile object, the state of a drive system of the mobile object, or the like. The state of equipment of the mobile object can be exemplified by the open/closed state of a door, the locked state of a door, or the like. If the mobile object is a bus, a ferry, a taxi, or the like, the open/closed state of the door is preferably the open/closed state of a door on the side where passengers get into the mobile object. For example, in Japan, a passenger of a taxi usually enters the taxi from a back door. Therefore, the open/closed state of the door is preferably the open/closed state of the back door. The state of the drive system of the mobile object can be exemplified by the remaining battery life, the active or stopped state of the drive system, the position of a gear, the operational state of the accelerator or brakes, or the like.

If the mobile object is used in a public transportation system or by a vehicle that is part of a public transportation system such as a train, a bus, a ferry, a taxi, or the like, or if the mobile object is used for business such as a delivery business or transport business, the state of the mobile object may include a business operation state of the mobile object. The business operation state of the mobile object indicates the state of a service currently provided by the mobile object, for a service that is provided by the mobile object when used by a worker. The state of the service may be information indicating whether the service is actually being provided to users, and may be determined according to a predetermined classification made by a government agency. For example, if the mobile object is a bus, a ferry, a taxi, or the like, a service for transporting passengers or packages to a target location is provided by having an automobile or the like used for a transportation business. In this case, the state of the service can be exemplified by states such as out of service, empty, full, en route, payment being made, or the like.

The communication system 100 uses one or more relay apparatuses mounted in one or more mobile objects to relay communication between the base station 20 and the communication terminal 30. In one embodiment, the communication control server 110 acquires mobile object information indicating each state of one or more mobile objects, and controls the one or more relay apparatuses based on this mobile object information.

For example, the communication control server 110 acquires information relating to the current position and the speed of the taxi 42 via the relay apparatus 124. The communication control server 110 judges whether the taxi 42 is stopped at a taxi stand (sometimes referred to as a taxi queue), based on the information relating to the current position and the speed of the taxi 42. When it is judged that the taxi 42 is stopped at a taxi stand, the communication control server 110 determines that the relay function of the relay apparatus 122 is to be activated and transmits to the relay apparatus 122 a signal for activating the relay function of the relay apparatus 122.

In another embodiment, the communication control server 110 acquires the mobile object information indicating each state of one or more mobile objects and controls the communication terminal 30 based on this mobile object information. For example, the communication control server 110 controls a handover of the communication terminal 30 based on the mobile object information.

As an example, the communication control server 110 acquires information relating to the business operation state of the taxi 42, via the relay apparatus 124. The communication control server 110 judges whether the taxi 42 has moved from the taxi stand or whether there is a high probability that the taxi 42 will move from the taxi stand, based on the information relating to the business operation state of the taxi 42. If it is judged that the taxi 42 has moved from the taxi stand or that there is a high probability that the taxi 42 will move from the taxi stand, the communication control server 110 determines that at least communication between the base station 20 and the communication terminal 30 outside of the taxi 42 is not to be relayed by the relay apparatus 122, and transmits to the communication terminal 30 a signal for controlling the handover of the communication terminal 30. Furthermore, the communication control server 110 transmits to the relay apparatus 122 a signal for deactivating the relay function of the relay apparatus 122.

As described above, with the present embodiment, the communication system 100 uses the mobile object information of one or more mobile objects to control one or more relay apparatuses. In this way, it is possible to deactivate the relay function of a relay apparatus mounted in a mobile object that is moving or has a high probability to move. Therefore, it is possible to construct a communication system with stable communication quality by using relay apparatuses mounted in mobile objects.

In a region where there are many users of the communication terminal 30, there is also a large number of mobile objects such as taxis. By mounting the relay apparatuses in the mobile objects, it is possible to easily set up a large number of relay apparatuses in an area with a large amount of traffic.

Furthermore, the distance between the relay apparatuses and the communication terminal 30 is less than the distance between the base station 20 and the communication terminal 30. Therefore, by having the base station 20 and the communication terminal 30 communicate via the relay apparatuses, it is possible to improve the communication speed.

In addition, since the relay apparatuses are mounted in the mobile objects, the relay apparatuses can include chasses that are larger than the communication terminal 30. Therefore, a larger number of antennas can be provided in comparison to the communication terminal 30. It is also possible to include smart antennas or the like that can realize higher quality processing in comparison to the antennas arranged in the communication terminal 30.

A smart antenna can change the antenna directivity according to the environment, through digital signal processing. A smart antenna may include a receiving section that receives a signal, a signal converting section that converts the signal received by the receiving section into a digital signal, and a directivity control section that controls the antenna directivity. The directivity control section generates a directivity that enables suppression of delayed waves and interference waves, by combining amplitudes and phases. In this way, it is possible to reduce the delayed waves caused by multipaths and the reception of interference waves, and to output a high quality signal to the target region. By including a smart antenna in a relay apparatus, it is possible to improve the reception sensitivity of the antenna and improve the communication speed.

Since the relay apparatuses are mounted in the mobile objects, the relay apparatuses can be supplied with power from batteries having higher capacity than the communication terminal 30. As a result, the limitations relating to the power consumption amount of the relay apparatuses are relaxed, and therefore it is possible to use complex algorithms that would be difficult to perform on the communication terminal 30. One example of such a complex algorithm is a relay apparatus acquiring position information of the communication terminal 30 at shorter time intervals compared to when there is a limitation on the power consumption amount. For example, the relay apparatus acquires the position information of the communication terminal 30 almost in real time. The relay apparatus can adjust the state of the relay function according to the communication environment of the communication terminal 30 and the acquired position information of the communication terminal 30. As a result, by having the base station 20 and the communication terminal 30 communicate via the relay apparatus, it is possible to improve the communication speed.

In the present embodiment, a relay apparatus 122 is mounted in the taxi 42. Furthermore, the relay apparatus 122 relays communication between the base station 20 and the communication terminal 30. More specifically, the relay apparatus 122 transmits the signal received from the base station 20 to the communication terminal 30, and transmits the signal received from the communication terminal 30 to the base station 20.

The relay apparatus 122 may be a femto base station that forms a communication area having a radius of approximately 10 meters (sometimes referred to as a femto cell). The relay apparatus 122 may be a frequency conversion relay apparatus. For example, the relay apparatus 122 includes a frequency converting section that performs conversion between a frequency band used for communication between the relay apparatus 122 and the base station 20 and a frequency band used for communication between the relay apparatus 122 and the communication terminal 30. The relay apparatus 122 may include a frequency converting section that performs a conversion between a communication system used for communication between the relay apparatus 122 and the base station 20 and a communication system used for communication between the relay apparatus 122 and the communication terminal 30. For example, the relay apparatus 122 may communicate with the base station 20 using a mobile object communication system such as 3G, LTE, or 4G, and communicate with the communication terminal 30 using another communication system such as wireless LAN or WiMAX.

The relay apparatus 124, the relay apparatus 126, and the relay apparatus 128 may each have the same configuration as the relay apparatus 122. In FIG. 1, the femto cell 54 and the femto cell 58 respectively indicate femto cells formed by the relay apparatus 124 and the relay apparatus 128.

The present embodiment is an example in which the communication control server 110 controls at least one of the one or more relay apparatuses. However, the communication system 100 of the present embodiment is not limited to this. In another embodiment, each of the one or more relay apparatuses may include a means for executing the same processing as the communication control server 110 and determine whether to activate or deactivate the relay function.

Each component of the communication system 100 may be realized by hardware, software, or a combination of hardware and software. For example, by executing a program, a computer may function as each component of the communication system 100.

The software or program described above may be stored on a computer readable medium such as a CD-ROM, DVD-ROM, memory, or hard disk, or may be stored on a storage apparatus connected to a network. The software or program may be installed in a computer of the communication system 100 from the computer readable medium or the storage apparatus connected to the network.

The program causing the computer to function as each component of the communication system 100 may include modules that regulate the operations of each component of the communication system 100. The program and modules act on the processor, communication interface, and the like to cause the computer to function as each component of the communication system 100 and to perform the information processing method of each component of the communication system 100.

The information processes recorded in the programs are read by the computer to cause the computer to function as a specific means realized by the cooperation of software and the hardware of each component of the communication system 100. With these specific means, a communication system 100 suitable for an intended use can be configured by realizing the calculations or computations appropriate for the intended use of the computer of the present embodiment.

The communication system 100 may be realized by activating software or a program that regulates the operation of each component of the communication system 100 by an information processing apparatus having a standard configuration. The information processing apparatuses used as the communication system 100 may include a data processing apparatus having a processor such as a CPU, a ROM, a RAM, a communication interface, and the like; an input apparatus such as a keyboard, a touch panel, or a microphone; an output apparatus such as a display apparatus or a speaker, and a storage apparatus such as a memory or an HDD. The data processing apparatus and storage apparatus described above may store the software and the programs described above. The communication system 100 may be a virtual server or a cloud system. Each function of the communication system 100 may be realized by a plurality of servers.

Figure 2:
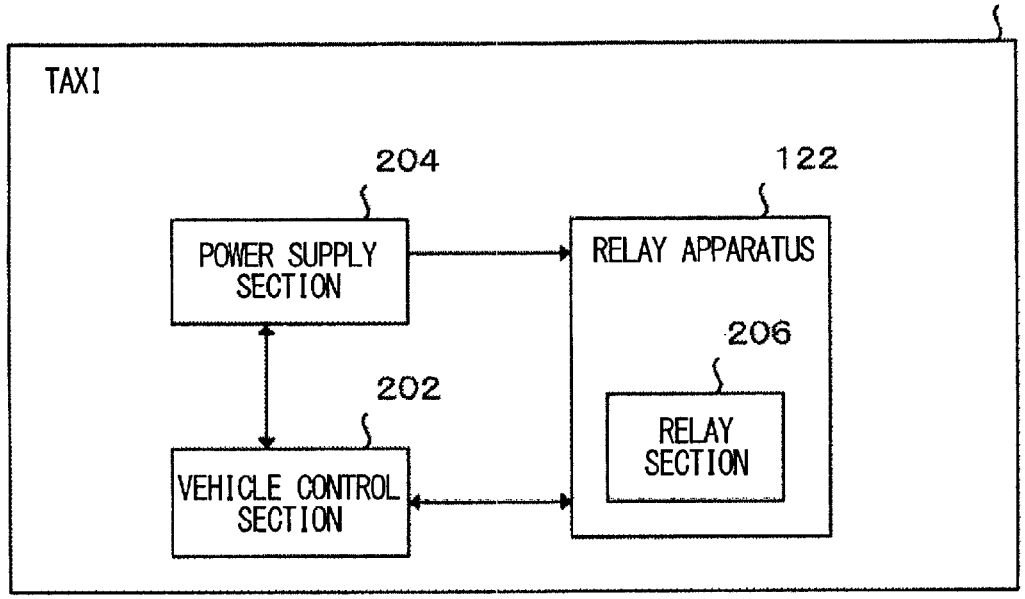
FIG. 2 schematically shows an exemplary system configuration of the taxi 42.

FIG. 2 schematically shows an exemplary system configuration of the taxi 42. In the present embodiment, the taxi 42 includes a relay apparatus 122, a vehicle control section 202, and a power supply section 204. The relay apparatus 122 includes a relay section 206. The taxi 44, the taxi 46, and the taxi 48 may each have the same configuration as the taxi 42.

The vehicle control section 202 controls the drive system of the taxi 42. The vehicle control section 202 controls communication with the engine, the motor, the doors, a navigation system, a display apparatus for displaying the business operation state, and an external computer.

The vehicle control section 202 gathers the mobile object information indicating the state of the taxi 42. The vehicle control section 202 may store the gathered mobile object information or transmit the gathered mobile object information to the communication control server 110. The vehicle control section 202 may transmit the gathered mobile object information to the communication control server 110 when a predetermined event occurs. The predetermined event can be exemplified by the passage of a predetermined time period, reaching a predetermined date, change of a predetermined state among the states of the taxi 42, and reception of a request from a server.

The vehicle control section 202 may be realized by hardware, software, or a combination of hardware and software. For example, a computer may function as the vehicle control section 202 by executing a program.

The power supply section 204 supplies power to the drive system of the taxi 42. The power supply section 204 supplies power to the vehicle control section 202 and the relay apparatus 122, for example. The power supply section 204 may notify the vehicle control section 202 about the remaining battery life.

The relay section 206 transmits the signal received from the base station 20 to the communication terminal 30, and transmits the signal received from the communication terminal 30 to the base station 20. The relay section 206 may adjust the relay function based on a control signal received from the communication control server 110, for example.

The relay section 206 may adjust the state of the relay function by adjusting the radio wave strength, the radio wave directivity, or the like. The state of the relay function can be exemplified by (i) relaying communication between the communication terminal 30 and the base station 20, (ii) not relaying communication between the communication terminal 30 and the base station 20, and (iii) relaying communication between the base station 20 and the communication terminal 30 within the vehicle but not relaying communication between the base station 20 and a communication terminal 30 outside of the vehicle.

Figure 3:
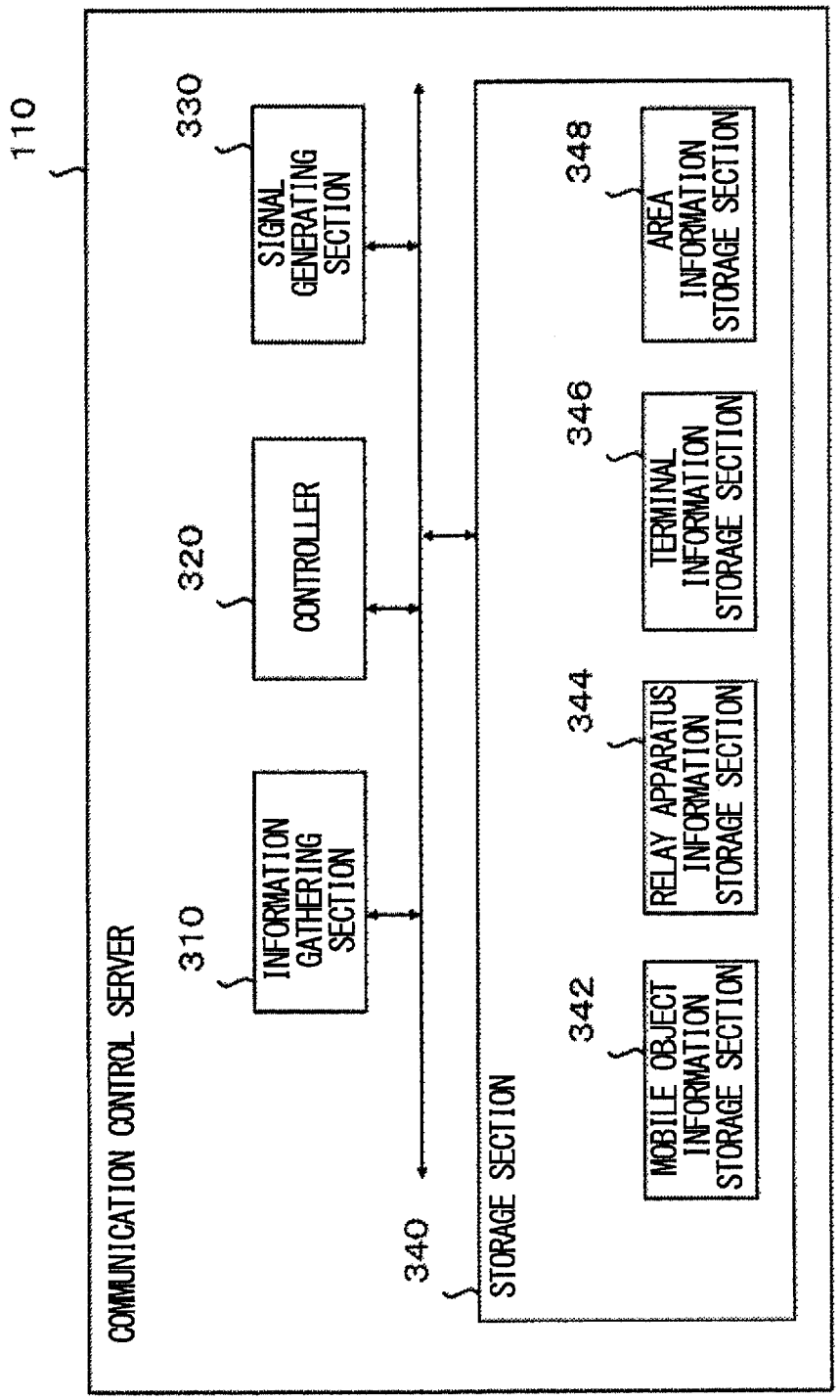
FIG. 3 schematically shows an exemplary system configuration of the communication control server 110.
Figure 4:
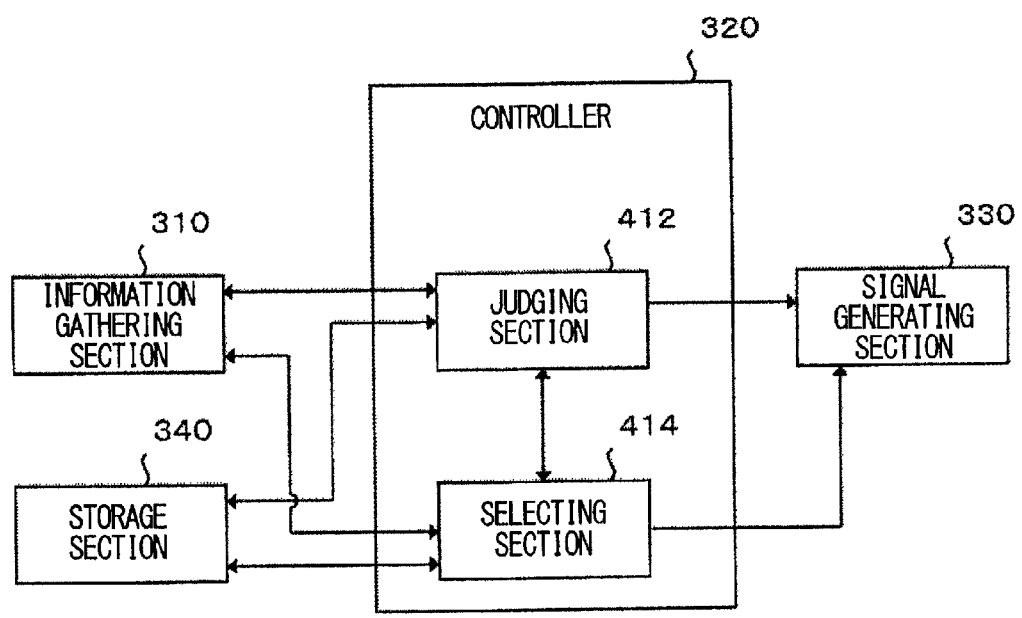
FIG. 4 schematically shows an exemplary system configuration of the controller 320.

The following describes the communication control server 110 using FIGS. 3 and 4. FIG. 3 schematically shows an exemplary system configuration of the communication control server 110. FIG. 4 schematically shows an exemplary system configuration of a controller 320.

In the present embodiment, the communication control server 110 includes an information gathering section 310, a controller 320, a signal generating section 330, and a storage section 340. The storage section 340 includes a mobile object information storage section 342, a relay apparatus information storage section 344, a terminal information storage section 346, and an area information storage section 348. The controller 320 includes a judging section 412 and a selecting section 414.

The information gathering section 310 is an example of at least one of a mobile object information acquiring section, a relay position acquiring section, a terminal position acquiring section, an area information acquiring section, a communication state acquiring section, and an analyzing section. The controller 320 is an example of at least one of a control apparatus and a relay apparatus selecting section. The signal generating section 330 is an example of a control signal generating section.

The information gathering section 310 acquires the mobile object information indicating the state of a mobile object. In one embodiment, the information gathering section 310 acquires the mobile object information indicating the state of the taxi 42 from the vehicle control section 202, via the taxi 42. In another embodiment, the information gathering section 310 acquires the mobile object information stored in another computer, via the communication network 10. For example, the information gathering section 310 acquires the position information, the movement history, and information relating to the business operation state of the taxi 42, the taxi 44, the taxi 46, and the taxi 48, from a management server that manages the allocation of the taxi 42, the taxi 44, the taxi 46, and the taxi 48.

The information gathering section 310 gathers the information requested for the information processing of the controller 320. The information gathering section 310 may notify the controller 320 about the gathered information, and may store the gathered information in the storage section 340.

The information gathering section 310 acquires the position information indicating the position of one or more relay apparatuses. The position information indicating the position of a relay apparatus may be position information of a mobile object in which this relay apparatus is mounted. The position information indicating the position of the relay apparatus may be GPS information of the location where the relay apparatus is arranged, radio wave information from an access point such as the base station 20, or information indicating a position calculated from this radio wave information.

The information gathering section 310 acquires the position information indicating the position of the communication terminal 30. The position information indicating the position of the communication terminal 30 may be GPS information, radio wave information from an access point such as the base station 20 or the relay apparatus, or information indicating a position calculated from this radio wave information.

The information gathering section 310 acquires the position information of one or more areas in which the relay function of the relay apparatus is to be activated. The position information of the one or more areas may be any information that indicates a geographical range of the area, and may be latitude and longitude information of the area, for example. In one embodiment, the information gathering section 310 acquires the position information of the one or more areas input by a manager of the communication system 100 from an input apparatus of the communication system 100. In another embodiment, the information gathering section 310 acquires the position information of the one or more areas stored in another computer, via the communication network 10.

The position information of the one or more areas may be associated with information relating to a direction of approach to the area. In this way, it is possible to selectively activate the relay functions of relay apparatuses mounted in mobile objects for which there is a high probability of the parking time being long in this area, for example. As a result, the communication quality of the communication system 100 can be made more stable.

For example, a situation can be imagined in which an area where the relay function is to be activated is a parking space near a taxi stand. Generally, a taxi stand is located on one side of a lane. Therefore, by referencing the direction of approach into the area, even if the accuracy of the position information is low, it is possible to perform a process to activate the relay function of the relay apparatus mounted in an automobile stopped in the taxi stand and not activate the relay function of the relay apparatuses mounted in vehicles that are stopped in the lane opposite the taxi stand.

The position of the one or more areas may be associated with identification information for the relay apparatus whose relay function is to be activated in the area. In this way, it is possible to selectively activate the relay functions of relay apparatuses mounted in mobile objects for which there is a high probability that the parking time in the area is long. As a result, the communication quality of the communication system 100 can be made more stable.

For example, when the area in which the relay function is to be activated is a parking space at the home of a specified individual, it is possible to perform a process by which the relay function of the relay apparatus mounted in the personal vehicle of this individual is activated when the personal vehicle is parked in this parking space and the relay function of the relay apparatus mounted in a vehicle other than the personal vehicle is not activated when this vehicle is parked in the parking space. Furthermore, it is possible to perform a process by which, among automobiles parked near a taxi stand, the relay functions of relay apparatuses mounted in taxis are activated and the relay functions of relay apparatuses mounted in vehicles that are not taxis parked in the parking space described above are not activated.

The position information of the one or more areas may be associated with information indicating a time span during which the relay function is to be activated in the area. In this way, it is possible to selectively activate the relay functions of relay apparatuses mounted in mobile objects for which there is a high probability that the parking time will be long in the area, for example. As a result, the communication quality of the communication system 100 can be made more stable.

The information gathering section 310 gathers information from at least one of the one or more communication terminals and the one or more relay apparatuses. The information gathering section 310 may handle the gathered data as so-called big data, analyze this big data, and acquire information that is useful for adjusting or setting the network.

For example, the information gathering section 310 gathers information identifying each of the one or more communication terminals whose communication was relayed by one or more relay apparatuses from each of the one or more relay apparatuses. The information gathering section 310 stores the position information of each of the one or more relay apparatuses and the information gathered from each relay apparatus in association with each other in the storage section 340.

For example, the information gathering section 310 gathers, from each of the one or more communication terminals, information identifying the communication terminal, position information of the communication terminal, information identifying a relay apparatus that relays communication at this position, and information relating to the quality of this communication. The information gathering section 310 may acquire movement history of each of the one or more communication terminals and information relating to a user of each of the one or more communication terminals, while considering personal information or while refraining from infringing on the privacy of the communication. The information relating to the user can be exemplified by a viewing history of the user, a search history of the user, terminal manipulation of the user, and the like.

The information gathering section 310 may analyze the gathered information and acquire a relationship between the position and the relay effect of the relay apparatus, for each position. For example, using the position information as a key, the information gathering section 310 extracts information relating to a specified geographical range from the big data stored in the storage section 340. The information gathering section 310 performs statistical processing on the information relating to the communication quality associated with the extracted information, and determines the relay effect in the geographical range described above. The information gathering section 310 stores the determination result in the storage section 340. The determination result is used to judge whether to activate the relay function of a relay apparatus mounted in a mobile object located in a specified geographical range, for example.

In the same manner, the information gathering section 310 may analyze the gathered data and determine the relay effect for each relay apparatus. The information gathering section 310 may analyze the gathered information and determine the relay effect at each time or for each time span. The information gathering section 310 may analyze the gathered information and determine the relay effect for each external factor. The external factors can be exemplified by items relating to the weather or climate, items relating to an event such as a concert or exhibit, and the like.

More specifically, the information gathering section 310 acquires, from a relay apparatus relaying communication between one or more communication terminals or between a communication terminal and the base station, information (sometimes referred to as log information) that associates with each other position information of the communication terminal, information relating to the communication quality at this position, information relating to the time during which communication is performed (sometimes referred to as the communication time), and information indicating the presence of a relay apparatus that relays the communication. The information indicating the presence of a relay apparatus may be identification information of the relay apparatus relaying the communication.

If a relay apparatus is a nano base station or a femto base station, the position information of the relay apparatus may be used as the position information of the communication terminal. The log information may be information associating the information relating to the communication time with the information relating to the communication quality for each of the one or more relay apparatuses. The information relating to the communication quality can be exemplified by handover frequency, communication speed, the frequency or probability of communication being cut off during a predetermined time period, and the like. The log information is an example of information indicating the communication state.

The information gathering section 310 calculates the effect of a relay apparatus on the communication quality in a specified area by performing a statistical process on the log information acquired from at least one of the one or more communication terminals and the one or more relay apparatuses. The information gathering section 310 may calculate the effect of the relay apparatus on the communication quality in the specified area for each time span. The effect of the relay apparatus on the communication quality in the specified area can be exemplified by the level or presence of the relay effect, the suitable number of relay apparatuses, and the like in the specified area.

In one embodiment, the information gathering section 310 classifies a plurality of pieces of log information according to the areas, based on the position information of the communication terminals or relay apparatuses included in the log information. Next, the pieces of log information classified according to each area are classified according to whether communication was relayed by the relay apparatus or communication was not relayed by the relay apparatus, based on the information indicating the presence of the relay apparatuses included in the log information.

Next, the information gathering section 310 calculates the relationship between the communication quality and the presence of relaying by the relay apparatuses in each area. For example, the information gathering section 310 calculates a percentage of instances where the communication quality passed a predetermined reference among the cases where communication was relayed by a relay apparatus, based on the information of the communication quality included in the log information, for example. The information gathering section 310 may calculate a percentage of instances where the communication quality conforms to a predetermined reference among the cases where communication was not relayed by a relay apparatus.

Next, the information gathering section 310 determines the level of the relay effect in each of a plurality of areas, based on the relationship between the communication quality and the presence of relay by the relay apparatuses. For example, in a specified area, the information gathering section 310 determines the level of the relay effect to be "high," "medium," "low," or "no effect" according to the percentage of instances where the communication quality conforms to a predetermined reference among the cases where communication was relayed by a relay apparatus. The information gathering section 310 may determine the level of the relay effect according to the difference between the percentage described above in cases where a relay apparatus relayed the communication and the percentage described above in cases where a relay apparatus did not relay the communication.

In another embodiment, the information gathering section 310 classifies the plurality of pieces of log information according to each area based on the position information of the communication terminal or the relay apparatus included in the log information. Next, the pieces of log information classified for each area are classified according to the number of relay apparatuses having active relay functions at the same time in each area, based on the identification information of the relay apparatuses and the communication times included in the log information.

Next, the information gathering section 310 calculates for the area the relationship between the communication quality and the number of relay apparatuses whose relay functions were active at the same time within the area. For example, the information gathering section 310 calculates the percentage of instances where the communication quality conforms to a predetermined standard for each number of relay apparatuses whose relay functions were active at the same time, based on the information of the communication quality included in the pieces of log information classified according to each number of relay apparatuses whose relay functions were active at the same time.

Next, the information gathering section 310 determines a suitable number of relay apparatuses and relay effect level in each area, based on the relationship between the communication quality and the number of relay apparatuses whose relay functions were active at the same time in the area. For example, in a specified area, if the communication quality decreases when the relay functions of six or more relay apparatuses are active at the same time, the information gathering section 310 determines that the suitable number of relay apparatuses for this area is less than or equal to five.

The information gathering section 310 references the information relating to the effect of the relay apparatuses on the communication quality in a specified area, and extracts a geographical range in which the effect of the relay apparatuses on the communication quality conforms to a predetermined standard. For example, the information gathering section 310 extracts a geographical range in which the level of the relay effect is "high," "medium," or "low." The information gathering section 310 determines one or more extracted geographical ranges to be the geographical ranges of one or more areas in which the relay functions of the relay apparatuses are to be activated.

The geographical ranges of the one or more areas in which the relay functions of the relay apparatuses are to be activated may be designated by the user. For example, a geographical range indicating a parking lot or a region near a taxi stand is designated as the geographical range of the one or more areas.

The information gathering section 310 may store the information acquired from the statistical process in the area information storage section 348. The information gathering section 310 may gather information relating to events in each area, population flow for each time span, and the like, and store this information in the area information storage section 348.

The controller 320 may function as a SON (Self Organizing Network). The controller 320 may automatically determine whether to activate or deactivate the relay apparatuses or automatically determine operation of the relay apparatuses, based on the information gathered by the information gathering section 310 from at least one of the communication terminals and the relay apparatuses. The controller 320 may change the settings of the relay apparatuses based on the information gathered by the information gathering section 310 from at least one of the communication terminals and relay apparatuses. The controller 320 may change the settings of the relay apparatuses based on results of the analysis performed by the information gathering section 310.

The controller 320 acquires at least one piece of mobile object information of the one or more mobile objects, from the information gathering section 310 or the storage section 340. In one embodiment, the controller 320 controls the relay apparatus mounted in a specified mobile object based on the mobile object information of this mobile object. In another embodiment, the controller 320 controls the communication terminal whose communication is relayed by the relay apparatus mounted in a specified mobile object based on the mobile object information of this mobile object.

In one embodiment, the judging section 412 judges whether a specified mobile object is parked based on the mobile object information of this mobile object. The judging section 412 judges whether the movement speed of the specified mobile object is less than a predetermined value, based on the mobile object information of this mobile object, and may determine that the mobile object is parked if the movement speed of the mobile object is less than the predetermined value.

More specifically, the judging section 412 may judge a specified mobile object to be parked if the movement speed of the mobile object is judged to be less than the predetermined value, based on information relating to at least one of the movement history, the movement speed, the acceleration state, the business operation state, and the state of the drive system of the mobile object. For example, if the business operation state of a specified mobile object is "empty" or "payment being made" or if the state of the drive system of the specified mobile object is "OFF," the judging section 412 judges that the movement speed of the mobile object is less than the predetermined value.

The judging section 412 may judge whether a specified mobile object is parked in a specified area based on the mobile object information of the mobile object. More specifically, using the position information of the current position of the specified mobile object as a key, the judging section 412 references the area information storage section 348 and judges whether the mobile object is located within the geographical range of at least one area among the one or more areas in which the relay function is to be activated. With the position information of the current position of the specified mobile object and the movement direction or orientation of the mobile object as a key, the judging section 412 may reference the area information storage section 348 and judge whether the mobile object is located within the geographical range of at least one area among the one or more areas in which the relay function is to be activated. In the same manner, the judging section 412 may judge whether a specified mobile object is parked in a specified area during a specified time span based on the mobile object information of the mobile object.

The judging section 412 may determine that the relay function of a relay apparatus mounted in a specified mobile object is to be activated when it is judged that the mobile object is parked. The judging section 412 may transmit to the signal generating section 330 identification information uniquely identifying a certain relay apparatus and information indicating that the relay function of the relay apparatus identified by the identification information is to be activated, in association with each other.

In another embodiment, the judging section 412 judges whether a specified mobile object is moving or has a high probability of moving, based on the mobile object information of the mobile object. The judging section 412 may judge whether the movement speed of the specified mobile object is greater than a predetermined value, based on the mobile object information of the mobile object, and judge the mobile object to be moving if it is judged that the movement speed of the mobile object is greater than the predetermined value.

More specifically, the judging section 412 may judge a specified mobile object to be moving if the movement speed of the mobile object is judged to be greater than the predetermined value, based on information relating to at least one of the movement history, the movement speed, the acceleration state, the business operation state, and the state of the drive system of the mobile object. For example, if the business operation state of a specified mobile object is "full," "out of service," or "en route," the judging section 412 judges that movement speed of the mobile object is greater than the predetermined value.

A case in which the judging section 412 judges whether a mobile object has a high probability of moving can be exemplified as shown below. First, the judging section 412 analyzes the movement history of the mobile object and extracts a time span during which the probability of the mobile object being parked for a time that is longer than a predetermined time is greater than a predetermined value. Next, the judging section 412 compares the current time to the extracted time span. If the current time is outside of the extracted time span, the judging section 412 judges that there is a high probability that the mobile object will move.

More specifically, the judging section 412 performs a statistical process on the movement history of the taxi 42, and acquires analysis results indicating that the taxi 42 has a probability of being parked for 30 minutes or more that is greater than a specified threshold value during time periods from 2:00 a.m. to 6:00 a.m. and 2:00 p.m. to 4:00 p.m. on weekdays and from 3:00 a.m. to 8:00 a.m. and 6:00 p.m. to 10:00 p.m. on weekends and holidays. The judging section 412 stores the acquired analysis results in association with the identification information uniquely identifying the taxi 42, in the mobile object information storage section 342.

When determining whether the relay function of the relay apparatus 122 mounted in the taxi 42 is to be activated, first, the judging section 412 references the mobile object information storage section 342 and extracts the analysis results associated with the identification information of the taxi 42. Next, the judging section 412 compares the current time to the analysis results. If the current time is not included in a time span indicated by the analysis results, the judging section 412 judges that there is a high probability that the taxi 42 will move. If the current time is included in a time span shown in the analysis results, the judging section 412 judges that there is a low probability that the taxi 42 will move.

A case in which the judging section 412 judges that there is a high probability that a specified mobile object will move can also be exemplified by a case where the business operation state of the mobile object is switched to "full," "out of service," or "en route" or a case where the state of the drive system of the mobile object is switched to "ON." The judging section 412 may judge the mobile object to have a high probability of moving when a door of the mobile object is opened.

When it is judged that a specified mobile object is moving or has a high probability of moving, the judging section 412 may determine that the relay apparatus mounted in the mobile object is to be deactivated. The judging section 412 may transmit the identification information uniquely identifying the relay apparatus and the information indicating that the relay function of the relay apparatus identified by the identification information is to be deactivated in association with each other, to the signal generating section 330.

In another embodiment, the judging section 412 determines whether the remaining battery life is less than a predetermined value, based on the remaining battery life of a specified mobile object included in the mobile object information of the mobile object. When it is judged that the remaining battery life of the specified mobile object is less than the predetermined value, the judging section 412 may determine that the relay function of the relay apparatus mounted in the mobile object is to be deactivated. The judging section 412 may transmit the identification information uniquely identifying the relay apparatus and the information indicated that the relay function of the relay apparatus identified by the identification information is to be deactivated in association with each other, to the signal generating section 330.

In another embodiment, the selecting section 414 selects a relay apparatus to relay the communication between the base station 20 and the communication terminal 30, based on the position information of a plurality of relay apparatuses and the mobile object information of mobile objects in which the plurality of relay apparatuses are mounted. For example, first, the selecting section 414 references the position information of the plurality of relay apparatuses and extracts each relay apparatus for which a distance from a specified relay apparatus is less than a predetermined value. In this way, it is possible to extract relay apparatuses that will possibly cause interference with the specified relay apparatus.

Next, the selecting section 414 extracts relay apparatuses whose relay functions may be activated from among the extracted relay apparatuses, based on the mobile object information of the mobile objects in which the extracted relay apparatuses are mounted. For example, the selecting section 414 extracts relay apparatuses mounted in mobile objects that are not moving, from among the extracted relay apparatuses.

Next, the selecting section 414 selects a relay apparatus whose relay function is to be activated from among the extracted relay apparatuses. The selecting section 414 may select the relay apparatus whose relay function is to be activated based on the mobile object information of the mobile objects in which the relay apparatuses are mounted. For example, the selecting section 414 selects relay apparatuses whose relay functions are to be activated in order of relay apparatuses mounted in mobile objects having the shortest parking times, from among the extracted relay apparatuses. In this way, it is possible to prioritize the activation of relay functions of relay apparatus mounted in taxis that are located further back in the taxi queue. As a result, it is possible to reduce the frequency of switching between activating and deactivating the relay functions of the relay apparatuses, and to stabilize the communication quality. The selecting section 414 may select the relay apparatus whose relay function is to be activated in a manner to decrease the frequency of switching the relay functions of the relay apparatuses between active and inactive, based on the current position information of the mobile objects in which the relay apparatuses are mounted.

In the present embodiment, after each relay apparatus whose distance from the specified relay apparatus is less than a predetermined value is extracted, the selecting section 414 extracts a plurality of relay apparatuses whose relay functions may be activated. However, the information processing of the selecting section 414 is not limited to this embodiment. In another embodiment, after a plurality of relay apparatuses whose relay functions may be activated are extracted, the relay apparatuses whose distance from the specified relay apparatus is less than the predetermined value may be extracted, and then the relay apparatus whose relay function may be activated may be determined. The selecting section 414 may apply the same process to each of the plurality of relay apparatuses.

The judging section 412 may transmit the identification information uniquely identifying the selected relay apparatuses and information indicating that the relay functions of the relay apparatuses identified by the identification information are to be activated in association with each other, to the signal generating section 330. The judging section 412 may transmit the identification information uniquely identifying the relay apparatuses that are not selected and information indicating that the relay functions of the relay apparatus identified by the identification information are to be deactivated in association with each other, to the signal generating section 330. In this way, it is possible to prevent interference when a plurality of relay apparatuses are located within a specified area.

In another embodiment, when it is determined that the relay function of a specified relay apparatus is to be deactivated, at least one of the judging section 412 and the selecting section 414 controls the handover of the communication terminal whose communication is being relayed by this relay apparatus. When at least one of the judging section 412 and the selecting section 414 has determined that the relay function of a specified relay apparatus is to be deactivated, the selecting section 414 may select another relay apparatus (sometimes referred to as the handover destination relay apparatus) to relay the communication between the base station and the communication terminal whose communication is being relayed by the current relay apparatus, based on the position information of a plurality of relay apparatuses, the position information of the communication terminal 30, and the mobile object information.

For example, the selecting section 414 may reference the position information of a plurality of relay apparatuses and extract relay apparatuses whose distance from the communication terminal described above is less than a predetermined value. The selecting section 414 selects the relay apparatuses whose relay functions may be activated from among the extracted relay apparatuses, based on the mobile object information of the mobile objects in which the extracted relay apparatuses are mounted.

Next, the selecting section 414 may select the handover destination relay apparatus from among the extracted relay apparatuses. The selecting section 414 may select the handover destination relay apparatus based on the distance between the relay apparatuses and the communication terminal. The selecting section 414 may select the handover destination relay apparatus based on at least one of the distance between the relay apparatuses and the communication terminal and the radio wave strength or signal strength between the relay apparatuses and the communication terminal.

The selecting section 414 may select the handover destination relay apparatus based on the movement history of a user of the communication terminal. For example, if the movement history of a specified user includes information indicating that the user has a strong tendency to be at a specified position during a specified time span, the selecting section 414 may select the handover destination relay apparatus while prioritizing a relay apparatus that is fixed near the specified position over relay apparatuses mounted in mobile objects.

If there is another relay apparatus whose relay function is to be activated, at least one of the judging section 412 and the selecting section 414 may transmit to the signal generating section 330 identification information uniquely identifying the relay apparatus whose relay function is to be deactivated, identification information uniquely identifying the communication terminal whose communication is being relayed by the relay apparatus identified by the identification information, and identification information uniquely identifying the handover destination relay apparatus, in association with each other. At least one of the judging section 412 and the selecting section 414 may transmit to the signal generating section 330 identification information uniquely identifying the relay apparatus whose relay function is to be deactivated and information indicating that the relay function of the relay apparatus identified by the identification information is to be deactivated, in association with each other. At least one of the judging section 412 and the selecting section 414 may transmit to the signal generating section 330 identification information uniquely identifying the handover destination relay apparatus and information indicating that the relay function of the relay apparatus identified by the identification information is to be activated, in association with each other.

If there is no other relay apparatus whose relay function is to be activated, at least one of the judging section 412 and the selecting section 414 may transmit to the signal generating section 330 identification information uniquely identifying the relay apparatus whose relay function is to be deactivated and information indicating that the relay function of the relay apparatus identified by the identification information is to be deactivated, in association with each other. At least one of the judging section 412 and the selecting section 414 may transmit to the signal generating section 330 identification information uniquely identifying the handover destination relay apparatus and information indicating that the relay function of the relay apparatus identified by the identification information is to be activated, in association with each other.

The signal generating section 330 generates a signal for controlling a specified relay apparatus. The signal generating section 330 may transmit the generated signal to this relay apparatus. The signal generating section 330 generates a signal for controlling a specified communication terminal. The signal generating section 330 may transmit the generated signal to this communication terminal.

The signal generating section 330 may generate signals according to instructions from the controller 320. For example, according to the controller 320, when the movement speed of a specified mobile object is less than a predetermined value, the signal generating section 330 generates a signal indicating that the relay function of the relay apparatus mounted in this mobile object is to be activated.

When it is judged that a specified relay apparatus is located within a specified area, the movement speed of the mobile object in which this relay apparatus is mounted is less than a predetermined value, and the relay function of this relay apparatus is to be activated, the signal generating section 330 may generate a signal indicating that the relay function of this relay apparatus is to be activated. The signal generating section 330 may generate signals indicating that the relay functions of the relay apparatuses not selected by the selecting section 414 are to be deactivated. The signal generating section 330 may generate a handover control signal for controlling the handover of the communication terminal, based on the selection results of the selecting section 414.

The storage section 340 stores the information received from the information gathering section 310. In response to a search request from the controller 320, the storage section 340 extracts information that conforms to the search request and transmits the extracted information to the controller 320. The mobile object information storage section 342 stores the identification information identifying each of the one or more mobile objects and the mobile object information indicating the state of each mobile object identified by the identification information, in association with each other.

The relay apparatus information storage section 344 stores the identification information identifying each of the one or more relay apparatuses and the information relating to each relay apparatus identified by the identification information, in association with each other. The information relating to a relay apparatus may include the position information indicating the position of the relay apparatus.

The terminal information storage section 346 stores the identification information identifying each of the one or more communication terminals and the information relating to each communication terminal identified by the identification information, in association with each other. The information relating to a communication terminal may include the position information indicating the position of the communication terminal.

The area information storage section 348 stores the identification information identifying each of the one or more areas in which the relay functions of the relay apparatuses are to be activated and the information relating to each area identified by the identification information, in association with each other. The information relating to an area may include position information indicating the position of the area or a geographical range of the area.

The information relating to an area may include information indicating the level of the relay effect in the area. The relay effect level may be determined according to the amount by which the communication quality of a communication terminal improves when the relay function of a relay apparatus mounted in a mobile object is activated. For example, the relay effect level is expressed as "high," "medium," or "low" according to the amount by which the communication quality of the communication terminal is improved. The relay effect level may be expressed as an integer from 1 to 5. The communication quality can be exemplified by the handover frequency, the communication speed, the frequency or probability of communication being cut off during a predetermined interval, and the like.

The information relating to an area may include information relating to the number of relay apparatuses whose relay functions are active at the same time. The information relating to the number of relay apparatuses may be a statistical amount relating to the number of relay apparatuses. In one embodiment, the information relating to the number of relay apparatuses is a maximum value for the number of relay apparatuses. In another embodiment, the information relating to the number of relay apparatuses is a suitable numerical range. The information relating to the number of relay apparatuses may be information for each time span. For example, the information relating to the number of relay apparatuses and information relating to an area may include information relating to each time span including the early morning, late morning, afternoon, evening, early night, and late night times on weekdays and the early morning, late morning, afternoon, evening, early night, and late night times on weekends and holidays.

In the present embodiment, an example is described in which the information gathering section 310, the controller 320, and the signal generating section 330 are arranged in the communication control server 110, and the communication control server 110 controls at least one of the one or more relay apparatuses. However, the information gathering section 310, the controller 320, and the signal generating section 330 are not limited to this embodiment. As another embodiment, the information gathering section 310, the controller 320, and the signal generating section 330 may be arranged in at least one relay apparatus.

FIG. 5 schematically shows an exemplary data table 500. The data table 500 is an example of a data table stored in the mobile object information storage section 342. In the present embodiment, the data table 500 stores a vehicle ID 502 identifying a vehicle, a current position 504 of the vehicle identified by the vehicle ID 502, a speed 506, a vehicle orientation 508, a drive system state 510, a remaining battery life 512, a business operation state 514, and a back door state 516, in association with each other. In the data table 500, the drive system of the taxi 46 is OFF. Therefore, the information relating to the business operation state 514 and the back door state 516 of the taxi 46 is not acquired.

According to the data table 500, the taxi 42 is parked facing eastward. Furthermore, the business operation state is "empty" and the back door is open, and therefore there is a high probability that the taxi 42 is the first vehicle in the taxi queue. For example, the judging section 412 determines that there is a high probability that the mobile object will move, using the information of the data table 500.

FIG. 6 schematically shows an exemplary data table 600. The data table 600 is an example of a data table stored in the relay apparatus information storage section 344. In the present embodiment, the data table 600 stores a relay apparatus ID 602 identifying a relay apparatus, a vehicle ID 604 of the vehicle in which the relay apparatus identified by the relay apparatus ID 602 is mounted, a current position 606 of the relay apparatus, and a relay function state 608 of the relay apparatus, in association with each other.

FIG. 7 schematically shows an exemplary data table 700. The data table 700 is an example of a data table stored in the terminal information storage section 346. In the present embodiment, the data table 700 stores a terminal ID 702 identifying a communication terminal, a current position 704 of the communication terminal identified by the terminal ID 702, and an access point ID 706 identifying an access point that relays the communication with the base station, in association with each other.

FIG. 8 schematically shows an exemplary data table 800. The data table 800 is an example of a data table stored in the area information storage section 348. In the present embodiment, the data table 800 stores an area ID 802 identifying an area in which the relay function of a relay apparatus is to be activated, a relay apparatus ID 804 of the relay apparatuses 122 whose relay functions are to be activated in the area identified by the area ID 802, a position 806 of the area, a direction of approach 808 into the area in which the relay functions are to be activated, a time span during which the relay functions are to be activated in the area, a time span 810 during which the relay functions are to be activated in the area, a relay effect 812 in the area, and information relating to the number of relay apparatuses 814 in the area, in association with each other. For the area provided with "tokyo_04" as the area ID, the data table 800 shows that the relay effect 812 for this area and the information relating to the number of relay apparatuses 814 in this area are not acquired.

The data table 800 shows that, in the area provided with "tokyo_03" as the area ID, for example, the area is being approached from the East and the relay functions of all of the relay apparatuses mounted in mobile objects that are parked in the area are to be activated. For example, the controller 320 uses the information of the data table 800 and extracts from the relay apparatuses located in a prescribed area, as the relay apparatuses whose relay functions are to be activated, the relay apparatuses conforming to the conditions shown by the direction of approach 808 and the time span 810 associated with the area ID 802 of this area.

The data table 800 shows that, in the area provided with "tokyo_03" as the area ID, the communication quality is greatly improved by activating the relay functions of the relay apparatus mounted in the mobile objects. Furthermore, in this area, it is understood that the communication quality can be efficiently improved by controlling the number of relay apparatuses whose relay functions are active at the same time to be no greater than ten. For example, using the information of the data table 800, the controller 320 determines the relay apparatuses whose relay functions are to be activated from among the relay apparatuses located in a specified area in a manner to conform to the condition indicated by the number of relay apparatuses 814 associated with the area ID 802 of this area.

In another embodiment, the controller 320 determines whether to deactivate the relay function of a relay apparatus mounted in a specified mobile object based on the remaining battery life of the mobile object included in the mobile object information of the mobile object. In this case, using the information of the data table 800, the controller 320 may determine the remaining battery life to serve as the reference for whether to deactivate the relay function based on the information shown by the relay effect 812 associated with the area ID 802 of an area where the mobile object is located. For example, if the relay effect 812 is "high," the relay function is deactivated when the remaining battery life is less than 20%. If the relay effect 812 is "medium," the relay function is deactivated when the remaining battery life is less than 60%. If the relay effect 812 is "low," the relay function is deactivated when the drive system is OFF, regardless of the remaining battery life.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: communication network, 20: base station, 30: communication terminal, 42: taxi, 44: taxi, 46: taxi, 48: taxi, 54: femto cell, 58: femto cell, 100: communication system, 110: communication control server, 122: relay apparatus, 124: relay apparatus, 126: relay apparatus, 128: relay apparatus, 202: vehicle control section, 204: power supply section, 206: relay section, 310: information gathering section, 320: controller, 330: signal generating section, 340: storage section, 342: mobile object information storage section, 344: relay apparatus information storage section, 346: terminal information storage section, 348: area information storage section, 412: judging section, 414: selecting section, 500: data table, 502: vehicle ID, 504: current position, 506: speed, 508: vehicle orientation, 510: state, 512: remaining battery life, 514: business operation state, 516: state, 600: data table, 602: relay apparatus ID, 604: vehicle ID, 606: current position, 608: state, 700: data table, 702: terminal ID, 704: current position, 706: access point ID, 800: data table, 802: area ID, 804: relay apparatus ID, 806: position, 808: direction of approach, 810: time span, 812: relay effect, 814: number of relay apparatuses

What is claimed is:

1. A control apparatus controlling a relay apparatus that is mounted in a mobile object and relays communication between a base station and a communication terminal, the control apparatus comprising:
   a mobile object information acquiring circuit that acquires mobile object information indicating a state of the mobile object; and
   a control circuit that controls the relay apparatus based on the mobile object information, wherein
   the control circuit judges whether movement speed of the mobile object is less than a predetermined value, based on the mobile object information, and
   if the movement speed of the mobile object is judged to be less than the predetermined value, the control circuit generates a relay control signal indicating that a relay function of the relay apparatus is to be activated.

2. The control apparatus according to claim 1, further comprising:
   a communication state acquiring circuit that acquires position information of the communication terminal, communication quality of communication at a position indicated by the position information of the communication terminal, information relating to time during which the communication is performed, and information indicating the presence of the relay apparatus that has relayed the communication; and
   an analyzing circuit that analyzes the information acquired by the communication state acquiring circuit and calculates an effect of the relay apparatus on communication quality in a specified area.

3. The control apparatus according to claim 1, further comprising:
   an area information acquiring circuit that acquires position information of one or more areas in which the relay function of the relay apparatus is to be activated, wherein
   the mobile object information includes position information of the mobile object,
   the control circuit further judges whether the relay apparatus is located in one of the one or more areas based on the position information of the mobile object and the position information of the one or more areas, and
   if it is judged that the relay apparatus is located in one of the one or more areas and that the movement speed of the mobile object is less than the predetermined value, the control circuit generates the relay control signal.

4. The control apparatus according to claim 3, wherein the position information of the one or more areas includes route of approach information in which information relating to a route of approach to each of the one or more areas is associated with information indicating whether the relay function of the relay apparatus is to be activated, the control circuit further determines whether the relay function of the relay apparatus is to be activated based on the position information of the mobile object and the route of approach information, and if it is judged that the relay apparatus is located in one of the one or more areas, the movement speed of the mobile object is less than a predetermined value, and the relay function of the relay apparatus is to be activated, the control circuit generates the relay control signal.

5. The control apparatus according to claim 3, further comprising:

a communication state acquiring circuit that acquires position information of the communication terminal, communication quality of communication at a position indicated by the position information of the communication terminal, information relating to time during which the communication is performed, and information indicating the presence of the relay apparatus that has relayed communication;

an analyzing circuit that analyzes the information acquired by the communication state acquiring circuit and calculates an effect of the relay apparatus on communication quality in a specified geographical range; and an effective area determining circuit that references an analysis result of the analyzing circuit, extracts a geographical range in which the effect of the relay apparatus on the communication quality conforms to a predetermined standard, and sets the extracted geographical range to be a geographical range of one or more areas in which the relay function of the relay apparatus is to be activated.

6. The control apparatus according to claim 1, further comprising:

a relay position acquiring circuit that acquires position information indicating positions of a plurality of the relay apparatuses; and a relay apparatus section circuit that selects the relay apparatus to relay communication between the base station and the communication terminal, based on the position information of the relay apparatuses and mobile object information of the mobile objects in which each relay apparatus is mounted.

7. The control apparatus according to claim 6, wherein the control circuit generates a control signal indicating that the relay functions of the relay apparatuses not selected by the relay apparatus selecting circuit are to be deactivated.

8. The control apparatus according to claim 1, further comprising:

a relay position acquiring circuit that is mounted in a mobile object and acquires position information indicating positions of a plurality of relay apparatuses relaying communication between the base station and the communication terminal;

a terminal position acquiring circuit that acquires position information indicating the position of the communication terminal; and a relay apparatus selecting circuit that selects a relay apparatus to relay communication between the base station and the communication terminal, based on the position information of the plurality of relay apparatuses, the position information of the communication terminal, and the mobile object information.

9. The control apparatus according to claim 8, further comprising:

a control signal generating circuit that generates a handover control signal for controlling a handover of the communication terminal, based on a selection result from the relay apparatus selecting circuit.

10. The control apparatus according to claim 1, wherein the relay apparatus is supplied with power from the mobile object.

11. A relay apparatus comprising:

a control apparatus controlling a relay apparatus that is mounted in a mobile object and relays communication between a base station and a communication terminal, the control apparatus comprising:

a mobile object information acquiring circuit that acquires mobile object information indicating a state of the mobile object; and a control circuit that controls the relay apparatus based on the mobile object information, wherein the control circuit judges whether movement speed of the mobile object is less than a predetermined value, based on the mobile object information, and if the movement speed of the mobile object is judged to be less than the predetermined value, the control circuit generates a relay control signal indicating that a relay function of the relay apparatus is to be activated; and a relay circuit that relays communication between the base station and the communication terminal.

12. A communication system comprising:

a relay apparatus; and a control apparatus controlling the relay apparatus that is mounted in a mobile object and relays communication between a base station and a communication terminal, the control apparatus comprising:

a mobile object information acquiring circuit that acquires mobile object information indicating a state of the mobile object; and a control circuit that controls the relay apparatus based on the mobile object information, wherein the control circuit judges whether movement speed of the mobile object is less than a predetermined value, based on the mobile object information, and if the movement speed of the mobile object is judged to be less than the predetermined value, the control circuit generates a relay control signal indicating that a relay function of the relay apparatus is to be activated.

13. A non-temporary computer readable medium storing program instructions which, when executed by a processor, cause the processor to perform steps, the steps comprising:

controlling a relay apparatus that is mounted in a mobile object and relays communication between a base station and a communication terminal, acquiring mobile object information indicating a state of the mobile object; and controlling the relay apparatus based on the mobile object information, wherein the controlling judges whether movement speed of the mobile object is less than a predetermined value, based on the mobile object information, and if the movement speed of the mobile object is judged to be less than the predetermined value, the controlling generates a relay control signal indicating that a relay function of the relay apparatus is to be activated.

14. A control method for controlling a relay apparatus that is mounted in a mobile object and relays communication between a base station and a communication terminal, the control method comprising:
- acquiring mobile object information that indicates a state of the mobile object; and
- controlling the relay apparatus based on the mobile object information, wherein
- the controlling judges whether movement speed of the mobile object is less than a predetermined value, based on the mobile object information, and
- if the movement speed of the mobile object is judged to be less than the predetermined value, the controlling generates a relay control signal indicating that a relay function of the relay apparatus is to be activated.

15. The control method of claim 14, further comprising:
- acquiring position information indicating positions of a plurality of the relay apparatuses relaying communication between the base station and the communication terminal;
- acquiring position information indicating a position of the communication terminal; and
- selecting the relay apparatus to relay communication between the base station and the communication terminal based on the position information of the relay apparatuses, the position information of the communication terminal, and the mobile object information.

* * * * *